(12) United States Patent
Ousley et al.

(10) Patent No.: US 9,995,638 B2
(45) Date of Patent: Jun. 12, 2018

(54) COLD-JUNCTION-COMPENSATED INPUT TERMINAL OF A THERMOCOUPLE INSTRUMENT

(71) Applicant: NATIONAL INSTRUMENTS CORPORATION, Austin, TX (US)

(72) Inventors: Daniel H. Ousley, Austin, TX (US); Shaun M. Stelley, Austin, TX (US); David R. Pasternak, Austin, TX (US)

(73) Assignee: National Instruments Corporation, Austin, TX (US)

( * ) Notice: Subject to any disclaimer, the term of this patent is extended or adjusted under 35 U.S.C. 154(b) by 295 days.

(21) Appl. No.: 14/871,041

(22) Filed: Sep. 30, 2015

(65) Prior Publication Data
US 2016/0320250 A1    Nov. 3, 2016

Related U.S. Application Data

(60) Provisional application No. 62/155,327, filed on Apr. 30, 2015.

(51) Int. Cl.
*G01K 13/00* (2006.01)
*G01K 7/02* (2006.01)
*G01K 7/13* (2006.01)

(52) U.S. Cl.
CPC ...................... *G01K 7/13* (2013.01)

(58) Field of Classification Search
CPC .. G01K 7/13; G01K 7/01; G01K 7/02; G01K 13/00
(Continued)

(56) References Cited

U.S. PATENT DOCUMENTS

| 3,858,163 A | * | 12/1974 | Goodman | ............ | H01R 12/721 |
| | | | | | 361/785 |
| 5,339,217 A | * | 8/1994 | Cohen | .................. | H05K 1/0209 |
| | | | | | 174/252 |

(Continued)

FOREIGN PATENT DOCUMENTS

| CN | 104717844 A | * | 6/2015 | | |
| DE | 3771883 D1 | * | 9/1991 | ......... | H01L 23/4006 |

(Continued)

OTHER PUBLICATIONS

DeweSoft; Krypton presentation video posted on on YouTube; https://www.youtube.com/watch?v=TIfL96tPe0I; please take note of 1:55-2:15 where the connector area and cold junction sensor are shown in the video; Nov. 13, 2014.

*Primary Examiner* — Gail Kaplan Verbitsky
(74) *Attorney, Agent, or Firm* — Meyertons Hood Kivlin Kowert & Goetzel, P.C.; Jeffrey C. Hood

(57) ABSTRACT

Input terminal of a thermocouple (TC) instrument. The input terminal may include a printed circuit board (PCB), including an input portion configured to receive signals from a thermocouple, and an output portion configured to communicatively connect to the instrument. The input terminal may further include a sensor mounted on the PCB, configured to measure temperature at or near a cold junction of the input terminal. The PCB may include first traces connecting the input portion of the PCB to the output portion of the PCB, and configured to send TC signals to the TC instrument and second traces connecting the sensor to the output portion of the PCB, and configured to send temperature signals to the instrument. The traces may be configured to provide the TC signals and the temperature signals to the TC instrument without using metal pins.

20 Claims, 18 Drawing Sheets

(58) Field of Classification Search
USPC ............ 136/200; 702/130, 99; 327/512, 513
See application file for complete search history.

(56) References Cited

U.S. PATENT DOCUMENTS

| | | | | |
|---|---|---|---|---|
| 5,403,208 | A | * | 4/1995 | Felcman .............. H01R 12/721 |
| | | | | 439/60 |
| 6,004,833 | A | * | 12/1999 | Kovats ................ H01L 21/4846 |
| | | | | 257/E23.061 |
| 8,111,525 | B2 | * | 2/2012 | Ong ....................... H05K 1/141 |
| | | | | 361/740 |
| 2003/0116831 | A1 | * | 6/2003 | McCall ................. H01L 23/647 |
| | | | | 257/666 |
| 2007/0239001 | A1 | * | 10/2007 | Mehi ................... G01S 7/52017 |
| | | | | 600/437 |
| 2009/0316369 | A1 | * | 12/2009 | Ong ....................... H05K 1/141 |
| | | | | 361/748 |
| 2010/0181101 | A1 | * | 7/2010 | Han ..................... H05K 1/0216 |
| | | | | 174/260 |
| 2011/0268152 | A1 | * | 11/2011 | Becker ................... G01K 7/023 |
| | | | | 374/179 |
| 2012/0065923 | A1 | * | 3/2012 | Whiteley ............... G01K 7/023 |
| | | | | 702/130 |
| 2016/0192472 | A1 | * | 6/2016 | Prautzsch ............... H01L 23/34 |
| | | | | 361/720 |
| 2016/0211596 | A1 | * | 7/2016 | Kartheininger ......... G06F 1/188 |

FOREIGN PATENT DOCUMENTS

| | | | | |
|---|---|---|---|---|
| EP | 0232098 A1 | * | 8/1987 | ......... H01L 23/4006 |
| GB | 2321712 A | * | 8/1998 | ............. G01D 3/022 |

\* cited by examiner

COLD-JUNCTION-COMPENSATED INPUT TERMINAL OF A THERMOCOUPLE INSTRUMENT

PRIORITY DATA

This application claims benefit of priority to U.S. Provisional Application Ser. No. 62/155,327, titled "Cold-Junction-Compensated Input Terminal of a Thermocouple Instrument", filed Apr. 30, 2015, whose inventors are Daniel H. Ousley, Shaun M. Stelley, and David R. Pasternak, and which is hereby incorporated by reference in its entirety as though fully and completely set forth herein.

FIELD OF THE INVENTION

The present invention relates to the field of instrumentation, and more particularly to a cold-junction-compensated (CJC) input terminal of a thermocouple instrument.

DESCRIPTION OF THE RELATED ART

Measuring thermocouples, practically, requires a composite measurement, including a low level voltage measurement, e.g., less than 80 mV in magnitude, and an absolute temperature measurement of the temperature where the thermocouple wire terminates (referred to as the cold junction (CJ)). This secondary measurement is often called the Cold Junction Compensation (CJC) measurement.

In most cases, the error of the CJC measurement directly contributes to the overall error of the full thermocouple measurement, so it is advantageous to minimize the CJC measurement error where possible. There are two primary factors in the CJC error: 1) the absolute accuracy of the temperature sensor; and 2) the temperature difference between the location of the temperature sensor and the actual cold junction. The $2^{nd}$ factor is referred to as isothermal error.

Popular sensor technologies for CJC include resistive temperature detectors (RTDs), and thermistors with some lower performance usage of diode-based integrated circuit (IC) technologies. Recent advancements in IC technology performance have instigated new techniques for better performing isothermal solutions to take advantage of new performance and packaging available.

There are many ways that CJ sensors may be mounted for isothermal performance, but most, if not all, of these methods suffer from A) high material cost, B) difficulty to assemble, or C) poor performance in harsh conditions, or all three.

Exemplary Prior Art Techniques

The following describes various exemplary prior methods and their disadvantages:

One of the most cost effective implementations is to use a single thermistor placed near the input terminals of the thermocouple instrument to sense the general air temperature in the area of the cold junctions, as illustrated in prior art system 10 of FIG. 1, where, as shown, use of a shared (epoxy coated air-sensing) thermistor to measure temperature for multiple input terminals saves the cost of using respective thermistors for each cold junction. A specific implemented example of this approach is illustrated in FIG. 2, which shows a prior art system 11, specifically, a thermocouple input, model NI 9211, provided by National Instruments Corporation, where a single CJ sensor, so labeled, provides temperature sensing functionality regarding a compound input terminal (with multiple input terminals) that includes a header portion and a plug portion. As indicated, the cold junction (CJ) is inside the plug portion of the compound input terminal, and so its temperature may be measured by the CJ sensor when the two portions are joined and in operation. However, while being cost effective, this solution only has decent performance if the module or instrumentation has very little heat flow in the area of the input terminals. Errors (in measured temperature) can easily be greater than 2 Kelvin, depending on power fluctuations, orientation changes, wire gauge, and airflow.

A common method for improving on the cheap shared thermistor strategy is to lower the thermal resistance between the thermistor and any associated input terminals (cold junctions) by adding a sheet of copper or aluminum across the input portion of the instrument. The high thermal conductivity of the metal tends to reduce the thermal resistance across the physical distance between the input terminals and the thermistor. FIGS. 3 and 4 illustrate an exemplary prior art system 12 that implements this technique. More specifically, FIG. 3 shows an input terminal (comprising CJ) and a thermistor (comprising CJC), and particularly illustrates heat flow from the CJ (input terminal) to the CJ sensor (thermistor) via a traditional isothermal plane which is positioned above an FR-4 substrate, e.g., a glass/epoxy printed circuit board (PCB), where heat flow is represented in the Figure via arrows/vectors. FIG. 4 also illustrates prior art system 12, but shows more detail regarding the disposition of the input terminal with respect to the isothermal plane (metal sheet) and the FR-4 substrate of FIG. 3, where, as may be seen, heat flows from the input terminal through the input terminal (metal) pin, also referred to as a lead or leg, which extends through a copper thru-hole that conducts heat through the substrate into the isothermal plane. Note that heat flow vectors are not shown in the metal plate due to the assumption that the metal conducts extremely well, and so the FR-4 substrate is the bottleneck for thermal transfer. In other words, the (lack of) conductivity of the FR-4 substrate mitigates the benefits of the higher conductive isothermal plane. Thus, even though a conductive sheet metal plane is utilized, the technique as a whole doesn't perform well because of its dependence on FR-4 thermal conduction.

Moreover, these solutions require expensive sheet metal and additional manual assembly, and are heavy and bulky. While these solutions perform better than the cheapest approach described above (shared thermistor), the performance is still mediocre, with isothermal errors dependent on the same factors but to a slightly lesser degree.

Another common prior art technique is to simply remove the cold junctions from the area of power dissipation (and therefore away from heat flow). This can be done in many ways with any of a variety of commonly available connectors. FIG. 5 illustrates a prior art system 14 that implements thermally isolated cold junctions in an enclosure (or box). As shown, the enclosure includes a base, a cover, a connector for cable, multiple input terminals, and a single CJ sensor. Note that the CJ sensor and input terminals (CJs) are thermally isolated via their containment in the enclosure.

A down side to this approach is that it requires an enclosure, and usually a cable as well. This is fine in cases where an application provides plenty of space and budget, but for many applications the size required is unacceptable, and the additional costs of the enclosure and complexity of the extra cabling are prohibitive. Additionally these kinds of solutions often suffer from long settling times, e.g., greater than 10 minutes, and can still be prone to dependency on wire gauge and air flow, or even orientation.

National Instruments Corporation developed a technology in 2009 that provided a low cost means of using a single thermistor for multiple cold junctions with significant improvements in thermal resistance compared to traditional cheap or metal plate strategies. This technology makes use of overlapping thermal planes in the PCB to lower the thermal resistance between pins of nearby components. FIGS. 6-8 illustrate prior art systems based on this approach. More specifically, FIG. 6 illustrates a prior art system 15 that utilizes multiple overlapping isothermal planes (conductive plates or layers), where isothermal planes sandwich an FR-4 substrate (e.g., PCB), which itself contains a signal plane. As shown, heat flows from the input terminal through the terminal's metal pin to the signal plane, which transmits heat through the substrate to the two isothermal planes, thereby dissipating the heat. Note that the metal pin of the thermistor is isolated from the signal plane—the signal plane stops short of the thermistor's metal pin, so preventing electrical connection from the signal plane to the thermistor.

FIG. 7 illustrates exemplary prior art system 15, providing a more detailed view of heat flow from the input terminal through the input terminal (metal) pin to the signal plane, according to the overlapping isothermal planes approach. As may be seen, the (internal) signal plane carries energy outward from the input terminal, which increases the effective (thermal) cross sectional area of the FR-4 substrate through which heat may transfer. This lowers the thermal resistance to the isothermal planes. FIG. 8 illustrates an exemplary prior art system 16 that implements a version of the overlapping isothermal planes technique, specifically, a front mount isothermal screw terminal block, model NI TB-9214, for a NI 9214 16-channel isothermal thermocouple input module, both provided by National Instruments Corporation, where multiple (34) input terminals and CJ sensors are situated on a PCB with overlapping thermal planes.

While these solutions provide a significant performance improvement over other prior techniques, and achieve low cost and compact size, they still have some unavoidable performance difficulties that depend on the input terminal geometries. The technology works fairly well for input terminals that have short thick metal pins that have low thermal resistance between the terminal and the surface of the PCB. However the benefits of this technology cannot overcome the high thermal resistance of input terminals with long or skinny metal pins since the PCB technology only improves the thermal connection between points on a PCB, not between points on a PCB and points up in the air on an input terminal.

Some manufacturers or prior art systems have integrated sensors into their input terminals, as illustrated in FIG. 9, which shows a prior art system 17 that includes a slice I/O connector with integrated RTD, provided by Phoenix Contact. More specifically, FIG. 9 shows an input terminal implemented as a screw terminal input/connector that includes a plastic body with an open back. As shown, pressed into the back of the body of the input terminal is a CJ sensor in the form of an RTD whose metal pins, labeled "CJ sensor pins", have been bent so as to place the RTD/CJ sensor inside the body, and then affixed to one of the input terminal metal pins (so labeled) with an epoxy. This system is difficult to assemble due to the manual steps of bending RTD pins in just the right way, putting just the right amount of epoxy down in just the right location, and then the final solution is not very repeatable due to the wide tolerance in the adhesive thickness and the final location of the sensing element. This method provides good performance (typically) but is prohibitively expensive due to assembly.

Standard (prior art) thermocouple input terminal types such as the mini-thermocouple (miniTC) style often include sensor mounting features. FIG. 10 illustrates various implementations of another exemplary prior art system 18, specifically, various commercially available miniTC input terminals. As indicated, two basic variations are shown: variation A and variation B. Variation A is configured to receive a thermocouple sensor cable/male connector, and includes CJ sensor mounting features (holes/ports) whereby a CJ sensor may be installed, as well as screw-mounted metal pins protruding from the opposite side (from the cable/connector). Variation B, shown in various stages of deconstruction or teardown, includes similar CJ sensor mounting features, as well as screw-mounted metal pins protruding laterally from the terminal housing. The teardown of variation B further shows a dissected view showing the location of the CJ, which in this embodiment is on a metal blade that forms or is part of a receptacle portion, e.g., for receiving a plug, e.g., a miniTC plug.

FIG. 11 illustrates an exemplary prior art system 19, specifically, an exemplary miniTC input terminal similar to variation B of FIG. 10, wherein the approximate location of the CJ inside the plastic body is indicated. FIG. 11 further indicates the planar nature of the pin assembly in a side view (see right side of FIG. 11).

While these features can be helpful compared to having no mounting features whatsoever, they are still lacking in several ways: A) they can be difficult to work with in a high density connector block simply because there isn't enough room to insert the CJ sensors once the input terminals are soldered on; B) they still require careful bending of component pins and other precise manual steps that drive up cost and decrease repeatable performance; and C) manufacturers often put a thermal insulator such as molded plastic between the CJ sensor and the location of the cold junction, which creates higher thermal resistance between the CJ sensor and cold junction than is desired, while at the same time, D) leaving the CJ sensor exposed to surrounding air which can create an undesirable accuracy sensitivity to air currents if no further (manually intensive) epoxy coatings are added.

Some thermocouple instruments, such as the KRYPTON 8xTH® provided by DEWESoft®, use a thermocouple terminal that is embedded onto the PCB of the primary instrument. Said another way, portions of the input terminal are implemented by using the existing PCB (of the main PCB). This allows the CJC sensor to be surface-mounted in close proximity to the CJ of the thermocouple. While this implementation does provide some advantages in convenient CJC sensor placement, it is limited by several disadvantages.

First, since the terminal is integrated onto the main PCB it forces the orientation of the connector to be coplanar with the PCB of the primary instrument. This orientation requirement limits the proximity of the terminals to each other, which limits the density with which instruments using this kind of terminal can be deployed, e.g., to approximately half of the density of vertical orientation configurations.

Furthermore since the terminal is on the same PCB this forces the terminal to share a stack-up with the primary instrument. This requires compromises between which stack-up is most advantageous for the terminal and which is most advantageous for the primary instrument. Generally, using thick copper layers would be advantageous for providing low thermal impedance along planes in the terminal, and it is often advantageous to have the thermal planes (such as taught in U.S. Pat. No. 8,757,874) have very thin dielectric layers between them, whereas the primary instrument may have assembly challenges with thick planes, would cost more for the special copper thickness of the PCB, and may have different electrical impedance control requirements that need particular dielectric/laminate thicknesses in order to perform optimally.

Additionally, since the terminal design is in the same PCB as the primary instrument, the terminal is not an independent component so it cannot be directly leveraged into other instruments as a distinct component, nor can it be revised without triggering a redesign of all the instruments in which it is integrated. Furthermore since it is not a distinct component that can be independently manufactured by a connector manufacturer, it is unlikely to be deployed in large volume and thus may suffer from failing to achieve the economies of scale advantages that come with high volume deployment.

SUMMARY OF THE INVENTION

Various embodiments of a cold-junction-compensated (CJC) input terminal of a thermocouple instrument are presented below.

In some embodiments, an input terminal of a thermocouple (TC) instrument may be provided that includes a printed circuit board (PCB) and a thermal sensor, mounted on the PCB, and configured to measure temperature at or near a cold junction of the input terminal. In some embodiments, the input terminal may further include a TC receptacle portion, coupled to the PCB, and configured to receive a mating TC plug.

In one embodiment, the PCB includes an input portion, configured to receive signals from a thermocouple, and an output portion, configured to communicatively connect to the TC instrument. The PCB may further include a first plurality of traces connecting the input portion of the PCB to the output portion of the PCB, and configured to send TC signals to the thermocouple instrument, and a second plurality of traces connecting the thermal sensor to the output portion of the PCB, and configured to send temperature signals to the TC instrument. The traces at the output portion of the PCB may be configured to provide the TC signals and the temperature signals to the TC instrument without using metal pins.

In one embodiment, the PCB implemented pins may be configured to connect directly to another PCB in the thermocouple instrument. For example, the PCB implemented pins may include PCB tabs with respective traces that are configured to connect directly to corresponding slots in the other PCB in the thermocouple instrument. The PCB tabs with respective traces may implement a card edge style connector.

The PCB may include one or more mounting holes. Each mounting hole may include a respective pad configured to receive a mounting screw and to provide electrical connections for the TC signals from the TC receptacle portion to the PCB.

In one embodiment, at least one mounting hole may be configured to provide a low thermal impedance from the TC receptacle portion to the PCB. Additionally, a mounting screw of the at least one mounting hole may be proximate to the cold junction, and the thermal sensor may be situated proximate to the mounting screw, thereby providing for accurate measurement of temperature near the cold junction.

Note that as used herein, the term "proximate" means near enough to accurately measure the temperature at the cold junction within some tolerance, which may be application dependent. Thus, in various embodiments, the tolerance may be 1%, 2%, 5%, 10%, etc., depending on the accuracy required for a particular application.

In some embodiments, the PCB implemented pins may be configured to facilitate direct insertion into a host or main PCB via a wave process. In one embodiment, the PCB implemented pins may be configured to connect indirectly to another PCB in the thermocouple instrument via a receptacle of the thermocouple instrument.

The PCB may extend into the TC receptacle portion, and the extension of the PCB may include at least two pads, thereby providing electrical connections for the mating TC plug without using additional connection elements. Moreover, the TC receptacle portion may include one or more springs configured to provide reliable retention of, and electrical connection to, the mating TC plug. Additionally, the TC receptacle portion may also include one or more spring alignment features configured to hold the one or more springs in place.

The thermal sensor may be mounted on the input portion of the PCB proximate to one of the at least two pads. In another embodiment, the thermal sensor may be or include an integrated circuit that is mounted on one of the at least two pads.

Moreover, in some embodiments, the input terminal may further include a housing (e.g., an enclosure, body, or frame), where one or more of the PCB and the thermal sensor are included in the housing. In other words, the PCB and/or the thermal sensor (CJ sensor) of input terminal may be at least partially contained in a housing.

The input terminal thus implements (is) a cold-junction-compensated input terminal of a thermocouple instrument, various embodiments of which are described herein.

BRIEF DESCRIPTION OF THE DRAWINGS

A better understanding of the present invention can be obtained when the following detailed description of the preferred embodiment is considered in conjunction with the following drawings, in which.

Figure 1:
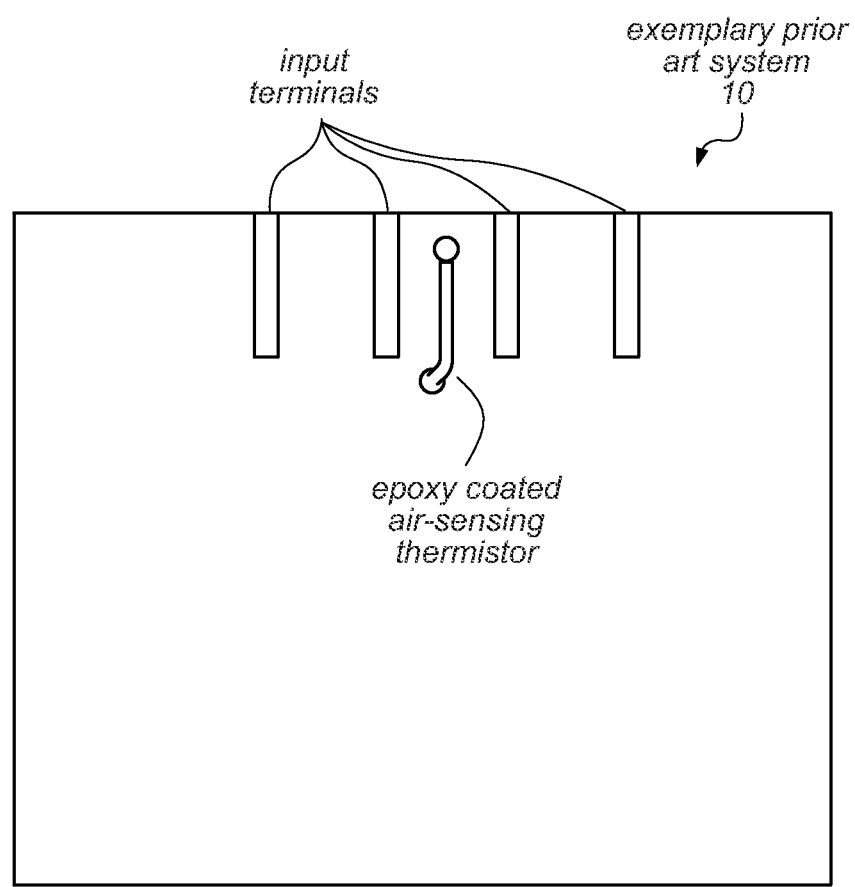
FIG. 1 illustrates inexpensive cold-junction-compensated (CJC) sensing with a shared thermistor, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 62/155,327, titled "Cold-Junction-Compensated Input Terminal of a Thermocouple Instrument", filed Apr. 30, 2015.

U.S. Pat. No. 8,757,874 titled "Temperature Sensing System and Method," issued on Jun. 24, 2014.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed).

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Metal Pin—refers to a metal screw, metal pin, or sheet metal blade that extends beyond the body of an electronic (or electrical) component, and configured to insert into or onto a printed circuit board (PCB) or other receptacle, e.g., a socket of the PCB, to attach and electrically connect the component to the PCB. This is a traditional means for connecting electronic components to a PCB. The PCB implemented pins disclosed herein are distinct from such metal pins.

PCB Implemented Pin—refers to an extension of a PCB that extends beyond the body of an electronic (or electrical) component, and configured to insert into or onto another PCB or a receptacle, e.g., a socket of the other PCB. The PCB implemented pin includes at least one pad and one or more traces, configured to attach and electrically connect the component to the other PCB or receptacle.

Cold Junction—refers to the physical location where a thermocouple wire made of two dissimilar metals terminates into a pair of similar metal receptacles, wires, or traces, i.e., the cold junction is the point in a thermocouple signal chain where the temperature sensitive sensing element stops and any further temperature variations deeper in the signal chain produce no further substantial thermoelectric voltage.

Cold Junction Compensation—refers to scaling a thermocouple signal, where the temperature of the cold junction has been determined through some means and is used to scale the thermocouple signal so as to calculate the absolute temperature of the probe end of the thermocouple.

Cold Junction Sensor—refers to a thermal sensor configured to measure temperature at (or near) the cold junction.

Exemplary Systems

Embodiments of the present invention may be involved with performing test and/or measurement functions; controlling and/or monitoring instrumentation or industrial automation hardware, etc. Exemplary test applications include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control or monitoring of other types of devices such as multimedia devices, video devices, audio devices, telephony devices, Internet devices, etc.

Figure 12A:
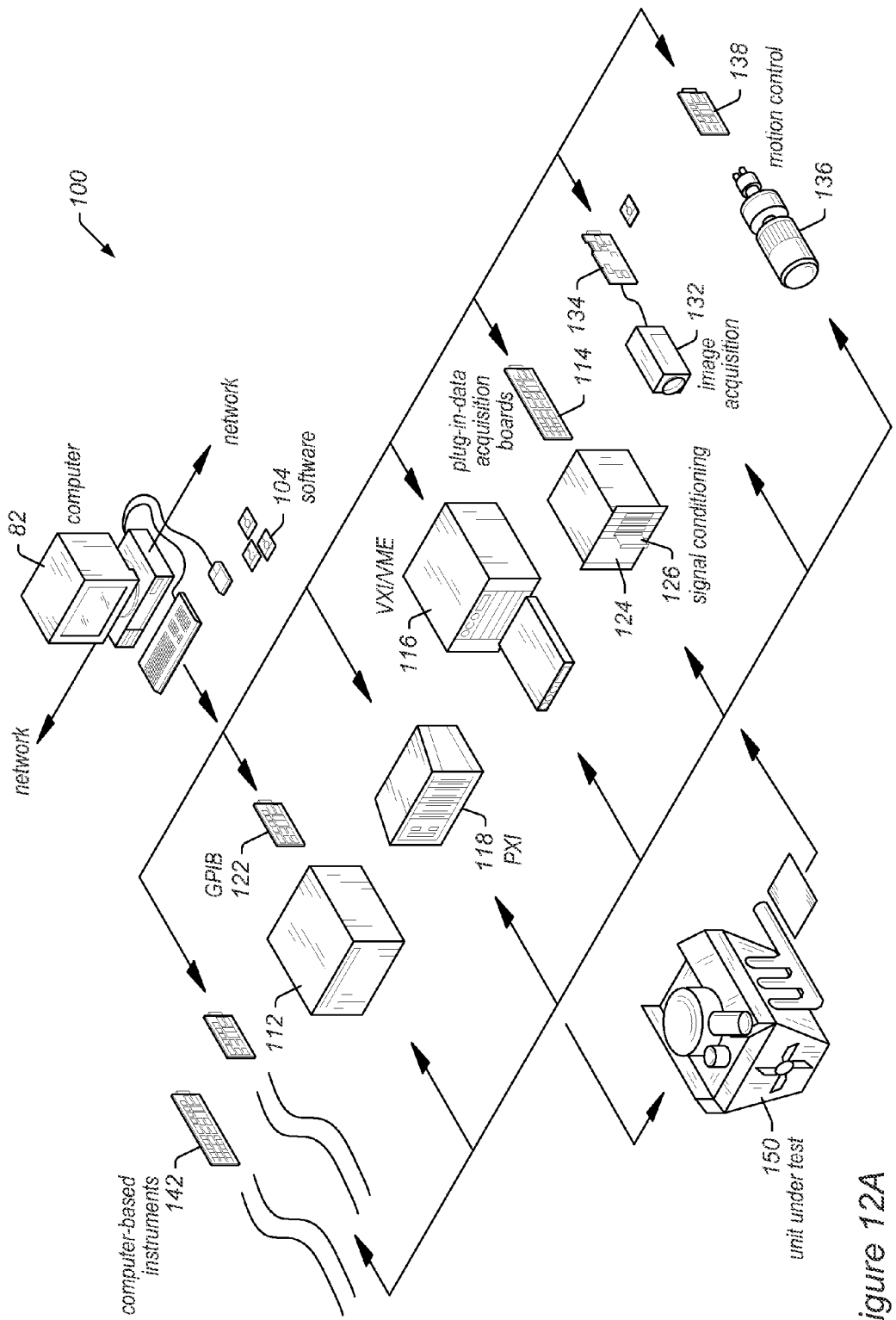
FIG. 12A illustrates an instrumentation control system according to one embodiment of the invention.

FIG. 12A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104. For example, the instrumentation control system 100 may include at least one instrument that is or includes a thermocouple instrument, and may use embodiments of the cold-junction-compensated (CJC) input terminal described herein.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2:
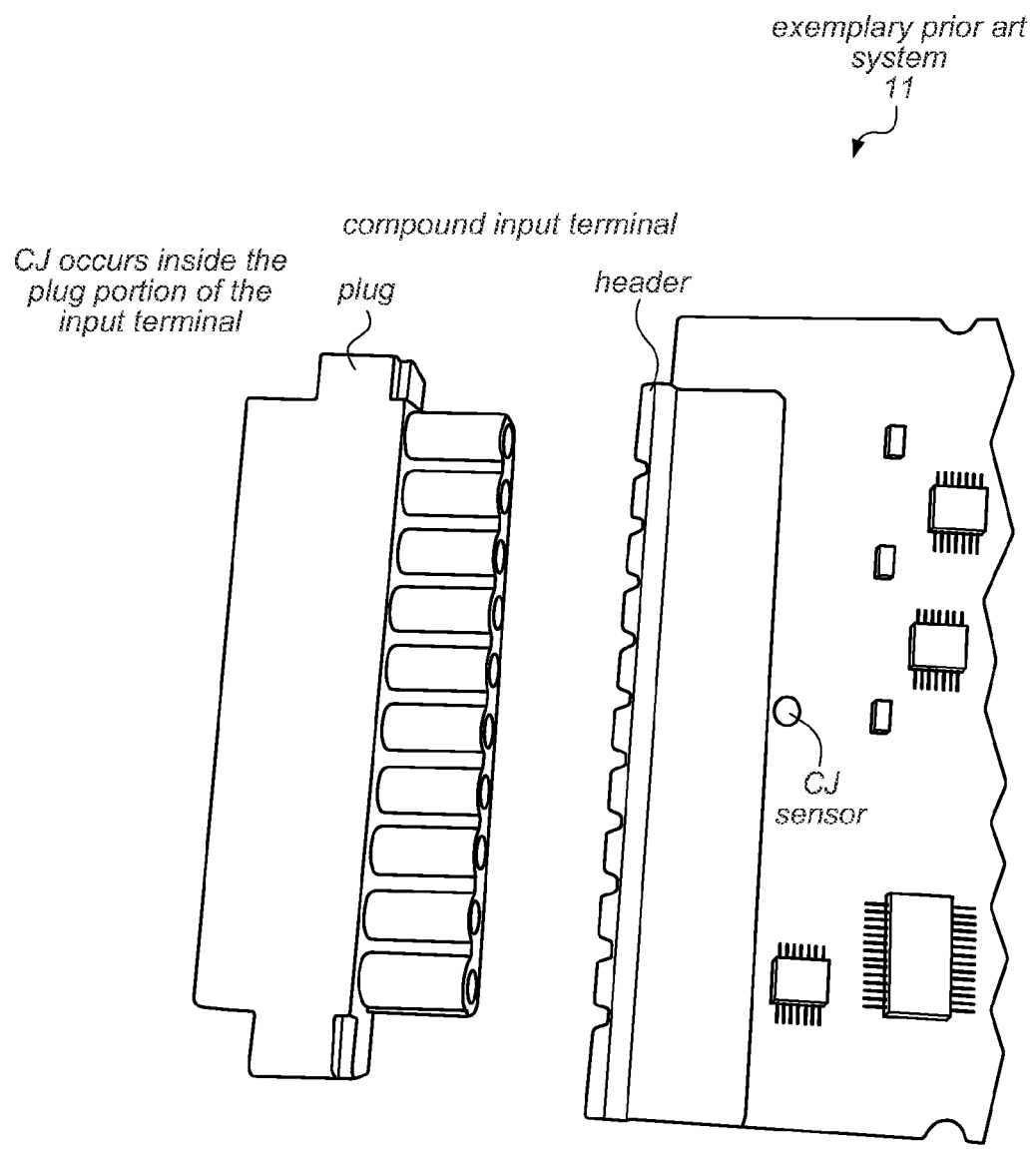
FIG. 2 illustrates a prior art commercial thermocouple input in which a single CJ sensor provides temperature sensing functionality regarding a compound input terminal.
Figure 3:
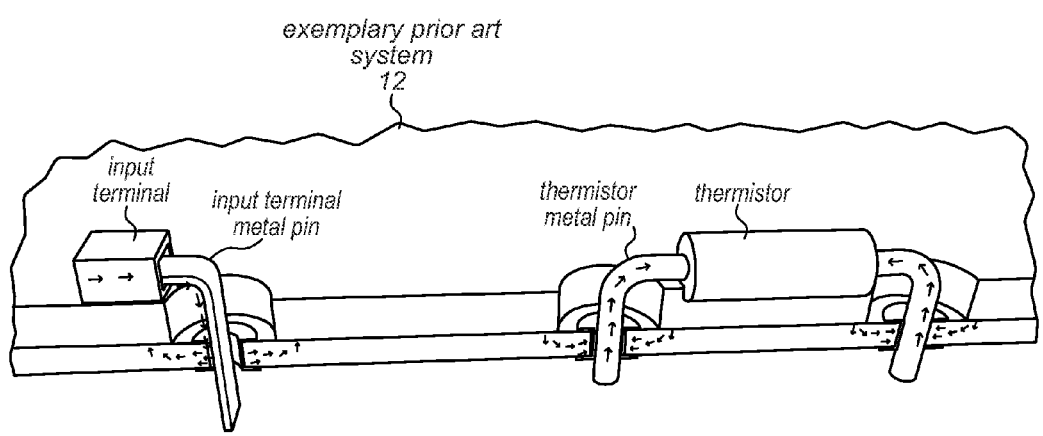
FIG. 3 illustrates heat flow in a CJC sensing system with a sheet of metal interposed between input terminals and a thermistor, according to the prior art.
Figure 4:
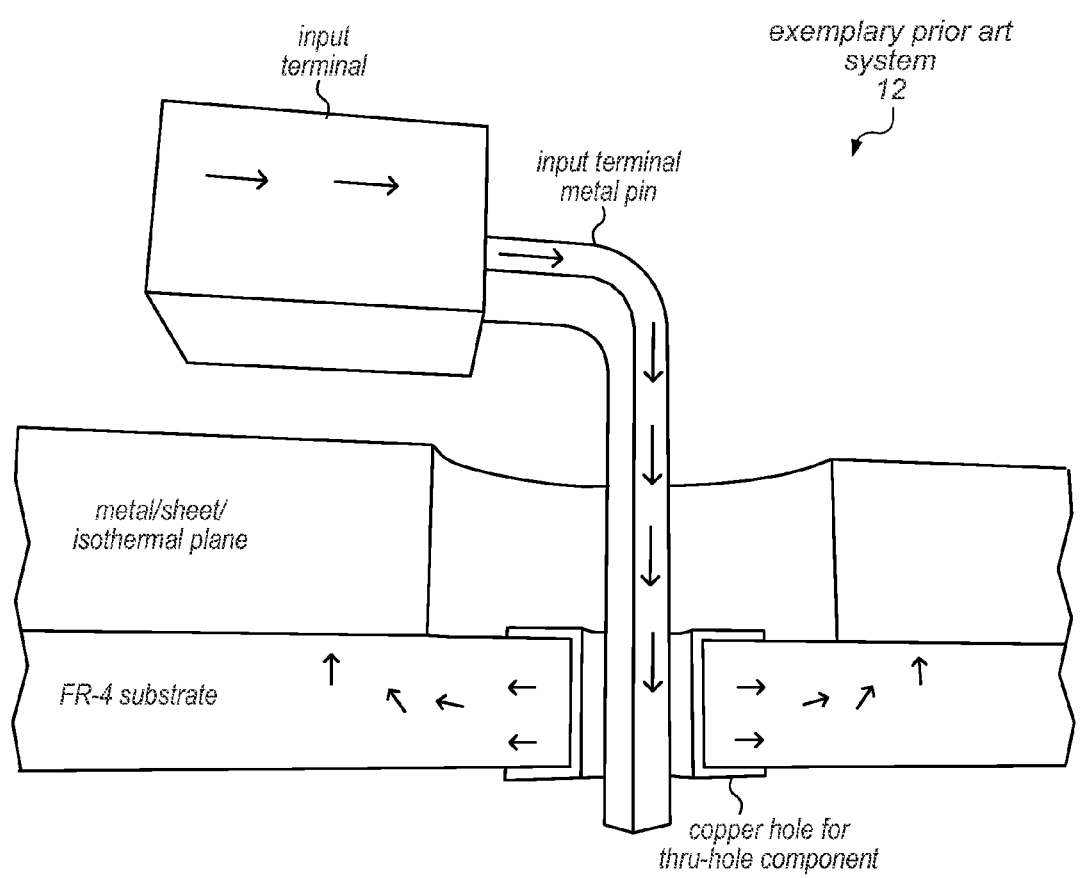
FIG. 4 illustrates heat flow from the CJ to the CJC via a traditional isothermal plane in a CJC sensing system, according to the prior art.
Figure 5:
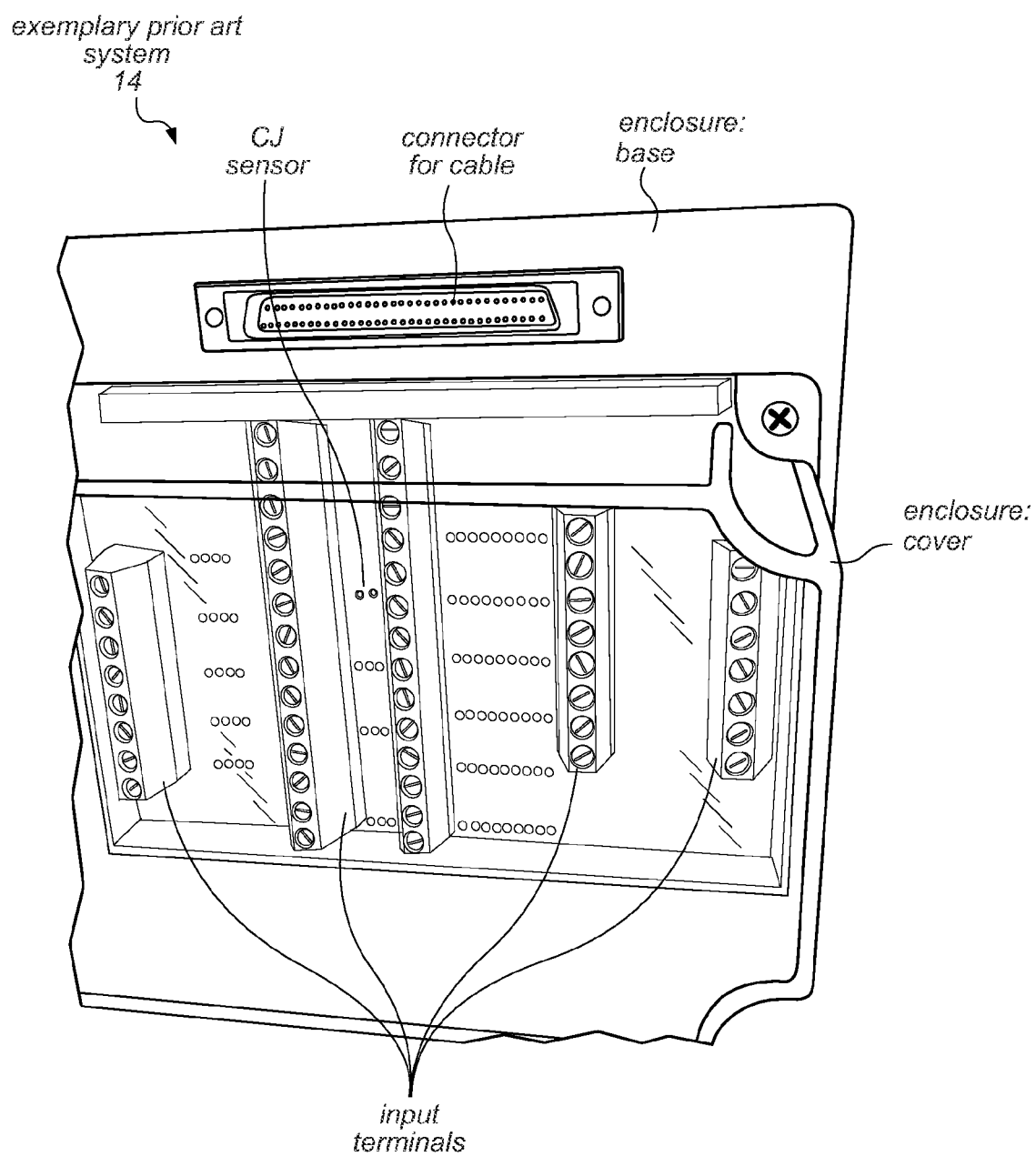
FIG. 5 illustrates a CJC sensing system that implements thermally isolated cold junctions in an enclosure, according to the prior art.
Figure 6:
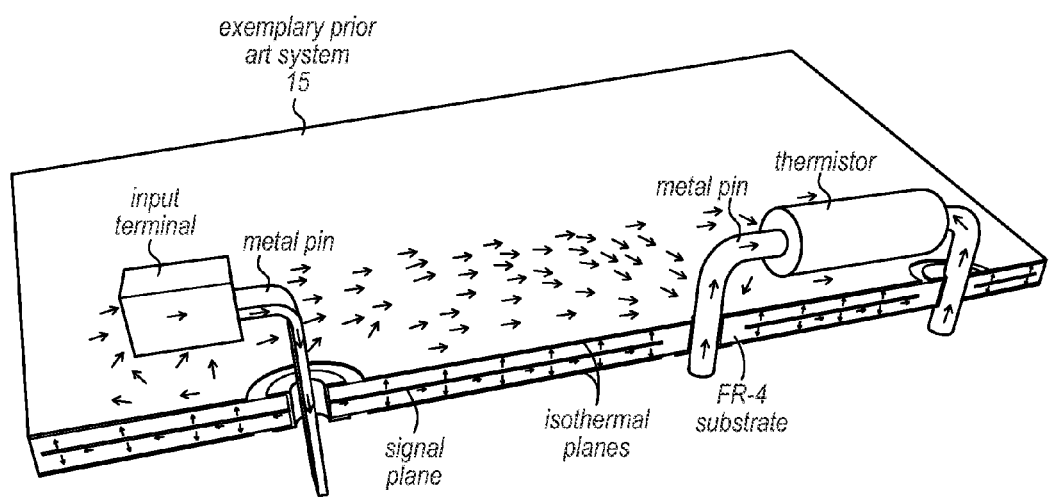
FIG. 6 illustrates heat flow in a CJC sensing system that utilizes overlapping isothermal planes, according to the prior art.
Figure 7:
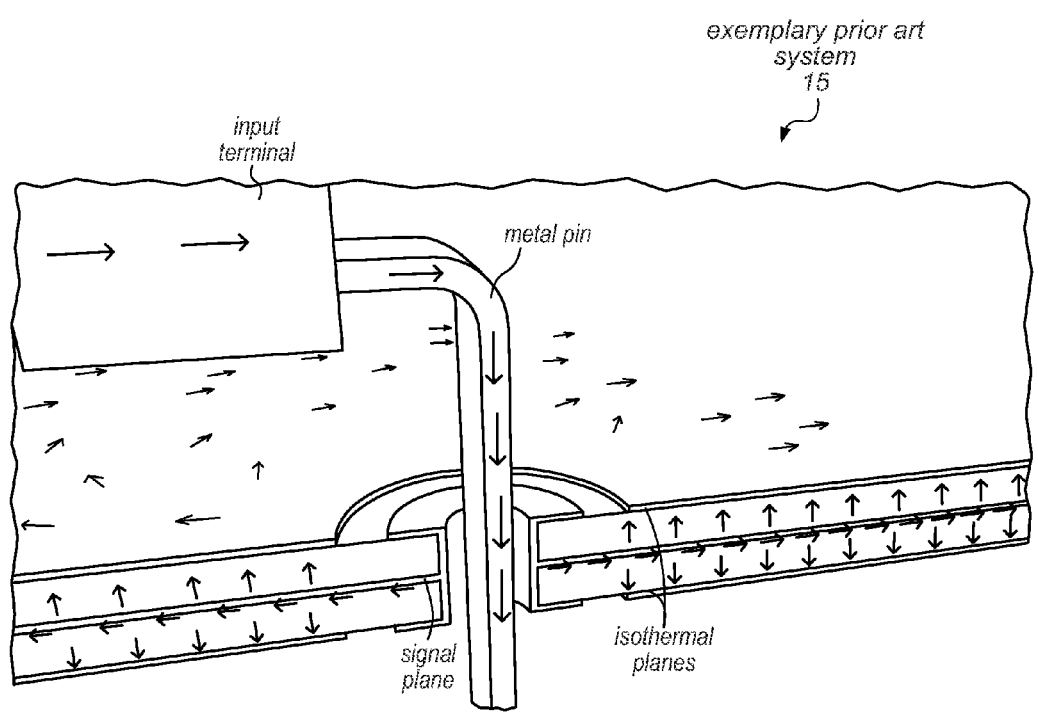
FIG. 7 illustrates a more detailed view of heat flow from an input terminal through the input terminal pin to the signal plane in a CJC sensing system that utilizes overlapping isothermal planes, according to the prior art.
Figure 8:
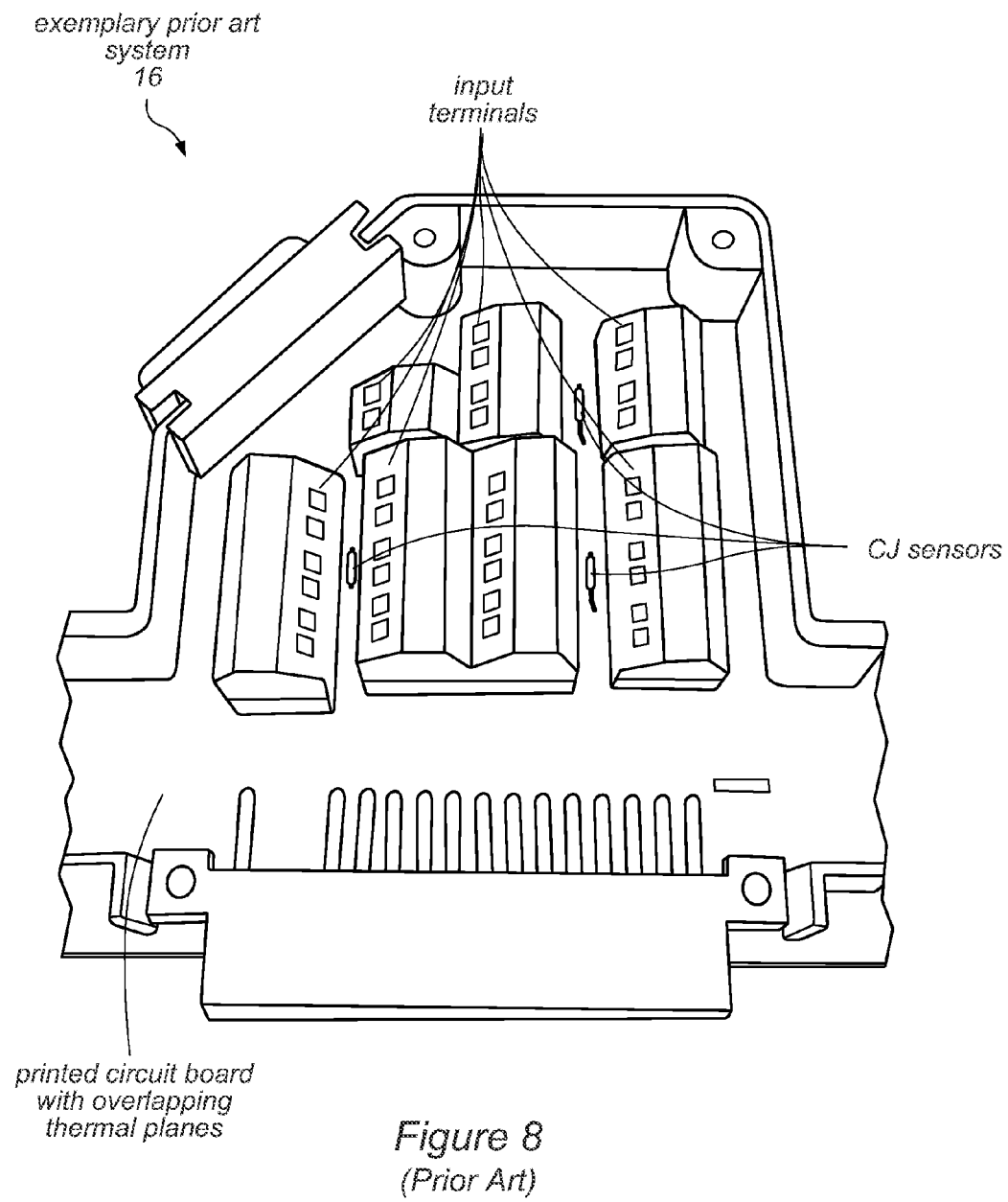
FIG. 8 illustrates a prior art commercial front mount isothermal screw terminal block for a 16-channel isothermal thermocouple input module.
Figure 9:
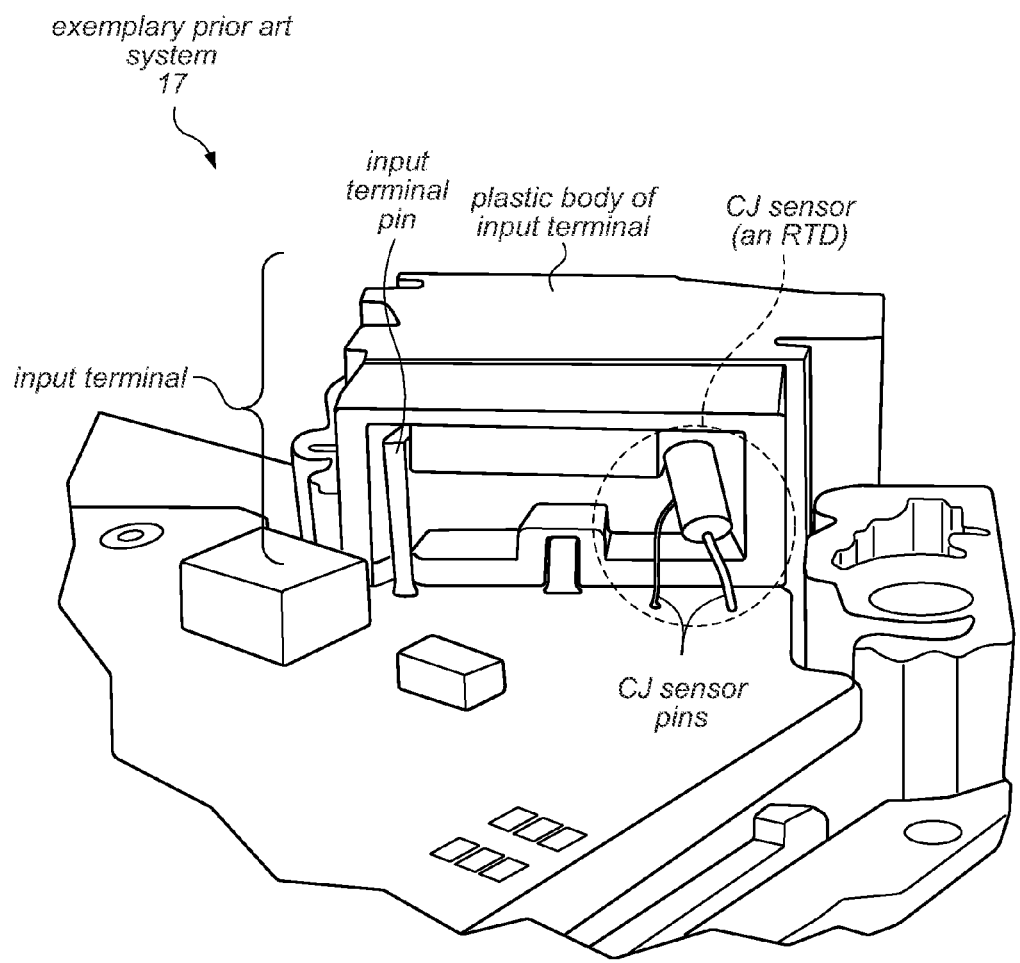
FIG. 9 illustrates a slice I/O connector with integrated resistive temperature detector (RTD), according to the prior art.
Figure 12B:
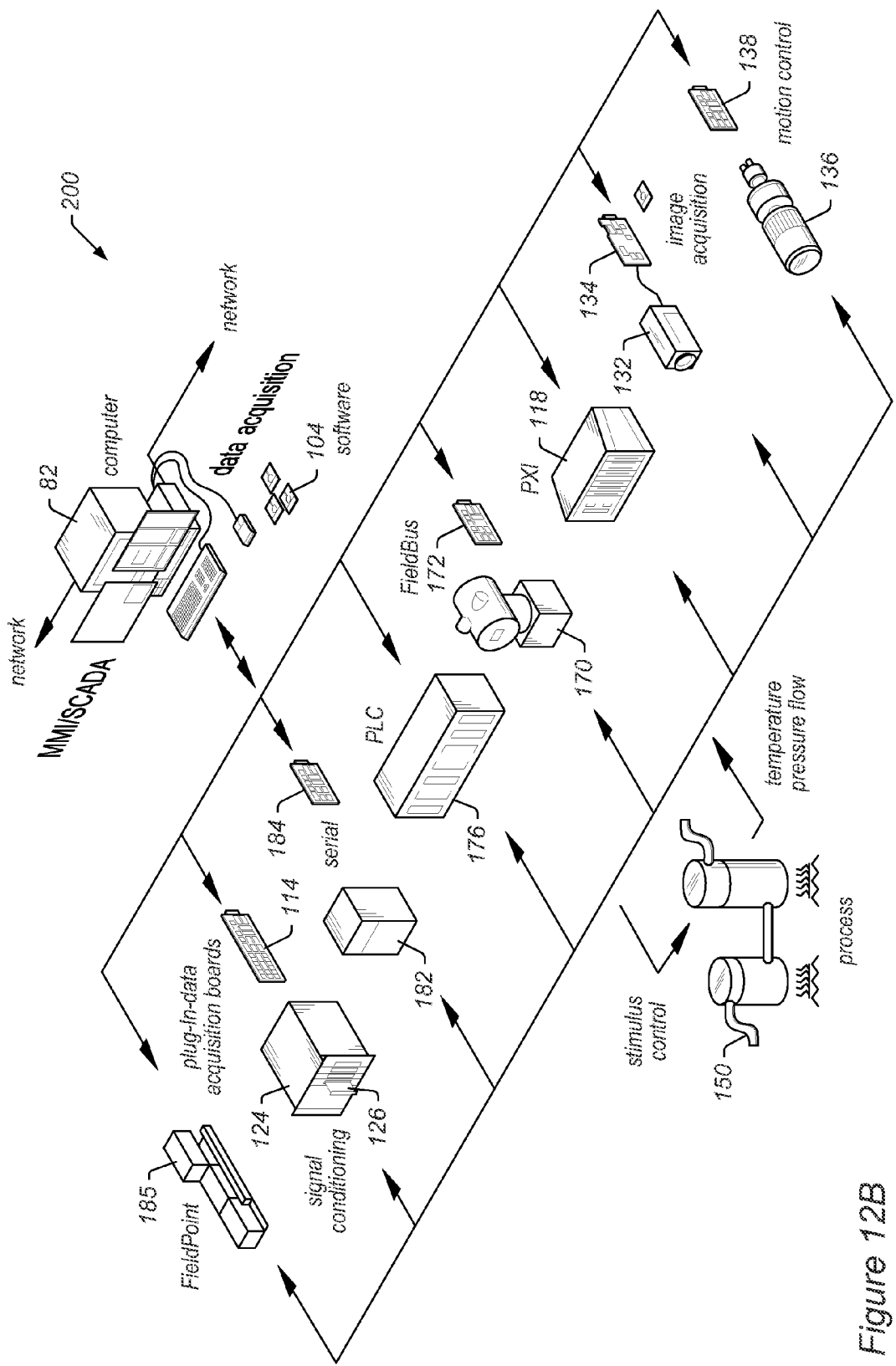
FIG. 12B illustrates an industrial automation system according to one embodiment of the invention.

FIG. 12B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as HMI (Human Machine Interface), SCADA (Supervisory Control and Data Acquisition), portable or distributed data acquisition, process control, advanced analysis, or other control, among others, e.g., via execution of software 104. Similar to the control system 100 of FIG. 12A, the industrial automation system 200 may include at least one device (e.g., instrument) that is or includes a thermocouple instrument, and may use embodiments of the cold-junction-compensated (CJC) input terminal described herein.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as Fieldpoint system 185, available from National Instruments Corporation, among other types of devices.

In embodiments of FIGS. 12A and 12B above, one or more of the various devices may couple to each other over a network, such as the Internet.

Figure 11:
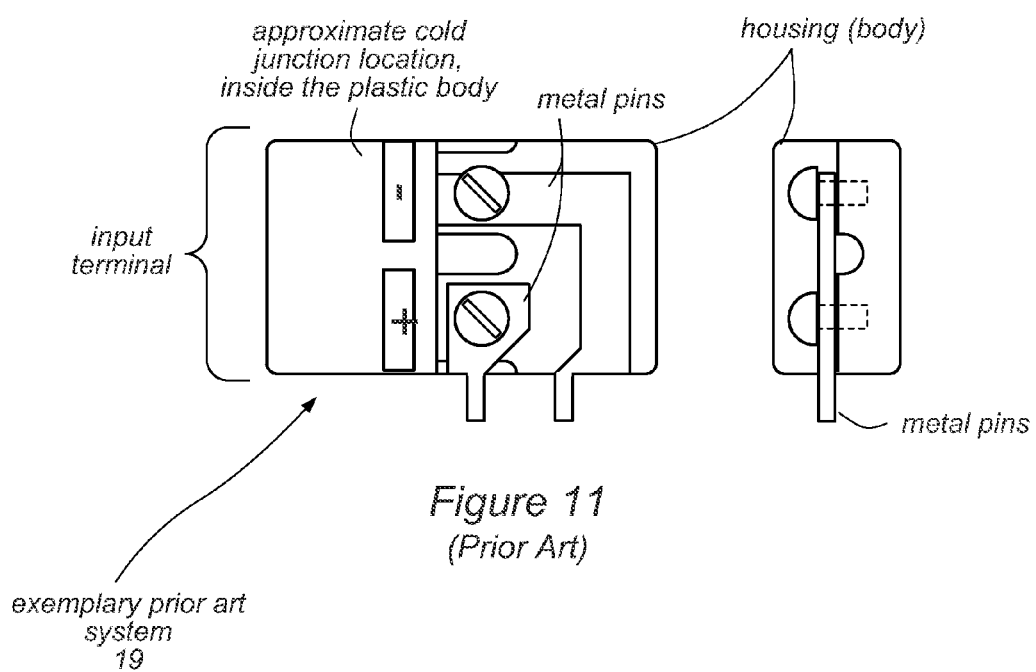
FIG. 11 illustrates an exemplary miniTC input terminal similar to variation B of FIG. 10, according to the prior art.

Returning again to FIG. 11, described above, which shows an exemplary assembled prior art miniTC input terminal (which is a very common type of input terminal for thermocouples), where the approximate location of the CJ inside the plastic body is indicated. More generally, the cold junction on a typical miniTC input terminal occurs at the intersection of a copper pin and the internal metal blade connected thereto, which occurs roughly in the area of the screws in FIG. 11. Accordingly, an excellent place for a temperature sensor would be near one of these screws.

Integrating a sensor into the input terminal may provide high performance, but can be expensive to assemble, and so embodiments of the novel techniques disclosed herein provide a more cost effective and easily assembled solution, specifically, replacing the copper (or other metal) pins of an input terminal connector with a printed circuit board that provides a location on which to mount a CJ sensor (a thermal sensor), and further, implements a board to board connector via which to affix the input terminal to another PCB. This dramatically simplifies the assembly process and lowers the cost of the input terminal by reducing component count and eliminating expensive sheet metal components (such as the metal (e.g., copper) pins).

Accordingly, in some embodiments, an input terminal of a thermocouple (TC) instrument may be provided that includes a printed circuit board (PCB) and a thermal sensor (e.g., a CJ sensor), mounted on the PCB, and configured to measure temperature at or near a cold junction of the input terminal. In some embodiments, the input terminal may include a TC receptacle portion, coupled to the PCB, and configured to receive a mating TC plug.

In one embodiment, the PCB includes an input portion, configured to receive signals from a thermocouple, and an output portion, configured to communicatively connect to the TC instrument. The PCB may further include a first plurality of traces connecting the input portion of the PCB to the output portion of the PCB, and configured to send TC signals to the thermocouple instrument, and a second plurality of traces connecting the thermal sensor to the output portion of the PCB, and configured to send temperature signals to the TC instrument. The traces at the output portion of the PCB may be configured to provide the TC signals and the temperature signals to the TC instrument without using metal pins. In other words, the PCB traces at the output portion of the PCB obviate the need for metal pins, and may be referred to herein as "PCB implemented pins".

In one embodiment, the PCB implemented pins may be configured to connect directly to another PCB in the thermocouple instrument. Said another way, the PCB may implement a board to board connector. For example, the PCB implemented pins of the PCB may include PCB tabs with respective traces that are configured to connect directly to corresponding slots in the other PCB in the thermocouple instrument.

Moreover, in some embodiments, the input terminal may further include a housing (e.g., an enclosure, body, or frame), where one or more of the PCB and the thermal sensor are included in the housing. In other words, the PCB and/or the thermal sensor (or CJ sensor) of the input terminal may be at least partially contained in a housing.

In some embodiments the input terminal may be oriented vertically, perpendicular to the plane of the primary instrument's PCB.

The input terminal thus implements (is) a cold-junction-compensated input terminal of a thermocouple instrument, various embodiments of which are described below.

Figure 13:
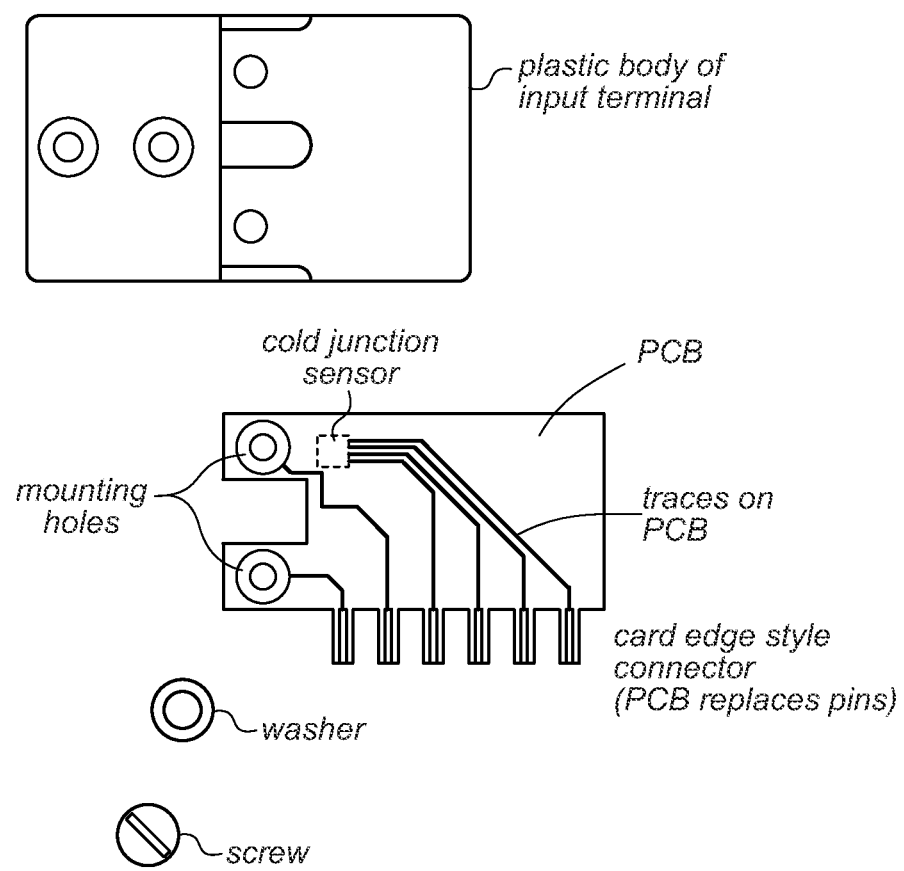
FIG. 13 illustrates an exemplary printed circuit board (PCB) implemented input terminal for a thermocouple instrument, according to one embodiment.

FIG. 13—Exemplary PCB Implemented Input Terminal for Thermocouple Instrument

FIG. 13 illustrates an exemplary embodiment of a PCB implemented input terminal for a thermocouple instrument (which may be referred to herein as a "TC input terminal"), in which both of the copper pins are replaced with a single PCB. As FIG. 13 shows, in this exemplary embodiment, the input terminal includes a body or housing, in this particular case, made from plastic (although other non-conducting materials may be used as desired), and the PCB, which includes a CJ sensor, also referred to herein as a thermal sensor (directed to measuring temperature at the CJ), multiple traces that extend to form a card edge style connector, as well as mounting holes, at least one of which may be a plated thru-hole and may be configured to receive a screw/washer, as shown. Note that the PCB traces may provide electrical connections from the card edge style connector to the CJ sensor and plated thru-holes, respectively. The card edge style connector may be configured to connect to another PCB, and so provide PCB-to-PCB connectivity for the input terminal. Note that the PCB implemented pins may carry both the thermocouple voltage signal (e.g., differential voltage), as well as temperature sensor signals from the input terminal to the second (e.g., main instrument) PCB.

Figure 14:
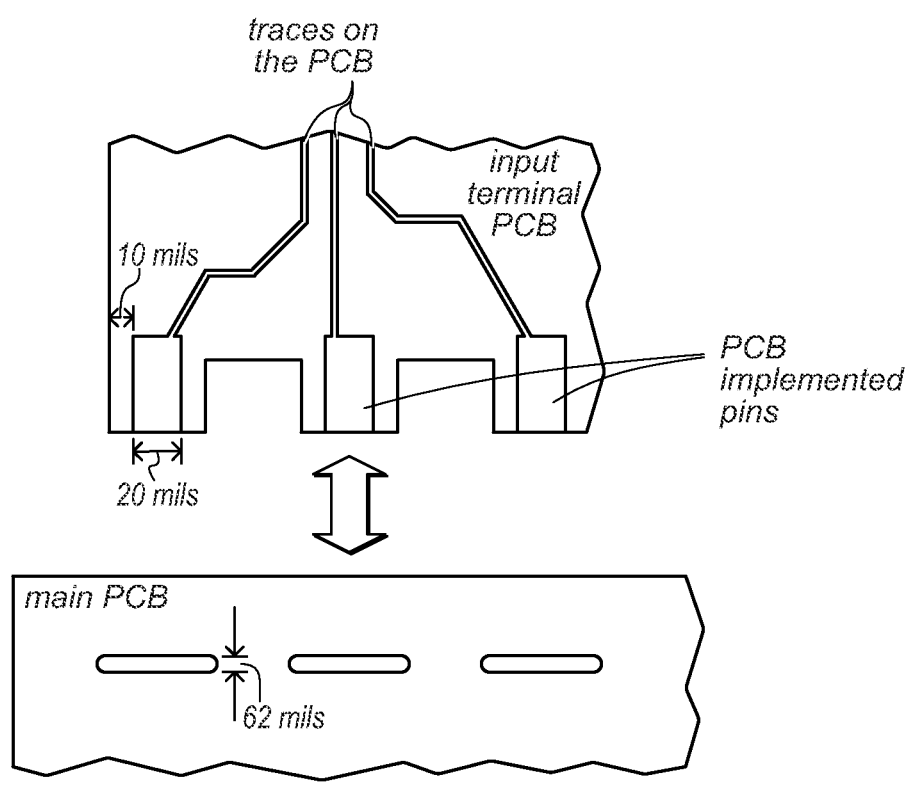
FIG. 14 illustrates an exemplary TC input terminal with PCB implemented pins, according to one embodiment.

FIG. 14 illustrates an exemplary embodiment of this feature, where an input terminal PCB includes three traces that are extended to form a three tab (or "tooth") card edge style connector configured for insertion into corresponding slots or holes in a second, e.g., "main", PCB, thus replacing standard or traditional metal pins that are generally used for such connections. As noted above, these connections are referred to herein as "PCB implemented pins" (PIPs). Thus, the size and shape of the tabs and slots are mutually compatible, which may be particularly amenable to wave process/method assembly. In other words, to reduce cost, in some embodiments, the input terminal PCB implemented pins may be configured/shaped to facilitate direct insertion into a host/main PCB through a wave process. For example, the PCB implemented pins (i.e., card edge style connector) on the input terminal PCB may have a comb shape, as shown at least in FIG. 13, and the second (or main) PCB may have a matching plated thru-hole pattern configured to receive the input terminal PCB implemented pins (tabs), as indicated in FIG. 14.

Thus, the PCB implemented pins may replace standard metal (e.g., copper or other sheet metal) pins, and further, may provide board-to-board (PCB-to-PCB) connectivity.

In the embodiment of FIG. 14, the PCB implemented pins or PIPs have 20 mm traces on 40 mm PCB tabs, and the slots or holes in the second (e.g., main) PCB are 62 mm thick, and wide enough to receive the PCB tabs. It should be noted however, that the number of tabs/slots and the dimensions shown are exemplary only, and are not intended to limit the PCB implemented input terminal to any particular form or shape, or number/shape of tabs and traces thereon.

In some embodiments, the PCB may include one or more mounting holes. Each mounting hole may include a respective pad configured to receive a mounting screw and to provide electrical connections for the TC signals from the TC receptacle portion to the PCB. At least one mounting hole may be configured to provide a low thermal impedance from the TC receptacle portion to the PCB. Moreover, a mounting screw of the at least one mounting hole may be proximate to the cold junction, and the thermal sensor may be situated proximate to the mounting screw, thereby providing for accurate measurement of temperature near the cold junction.

Figure 15:
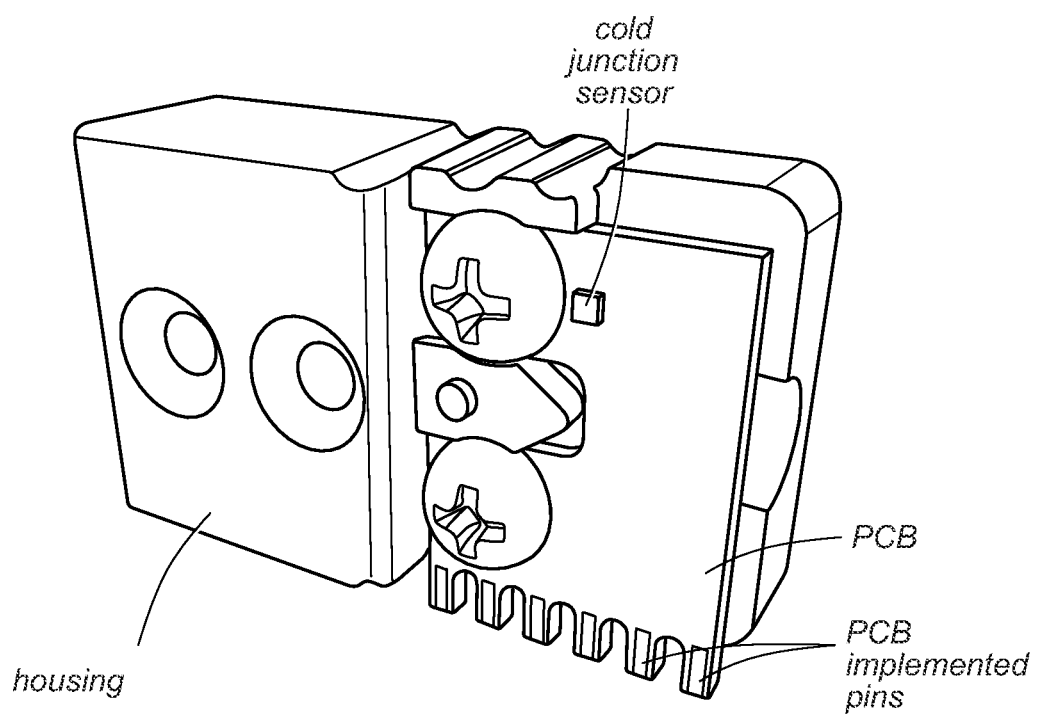
FIG. 15 illustrates a CAD drawing of an exemplary input terminal with PCB implemented pins, according to one embodiment.
Figure 16:
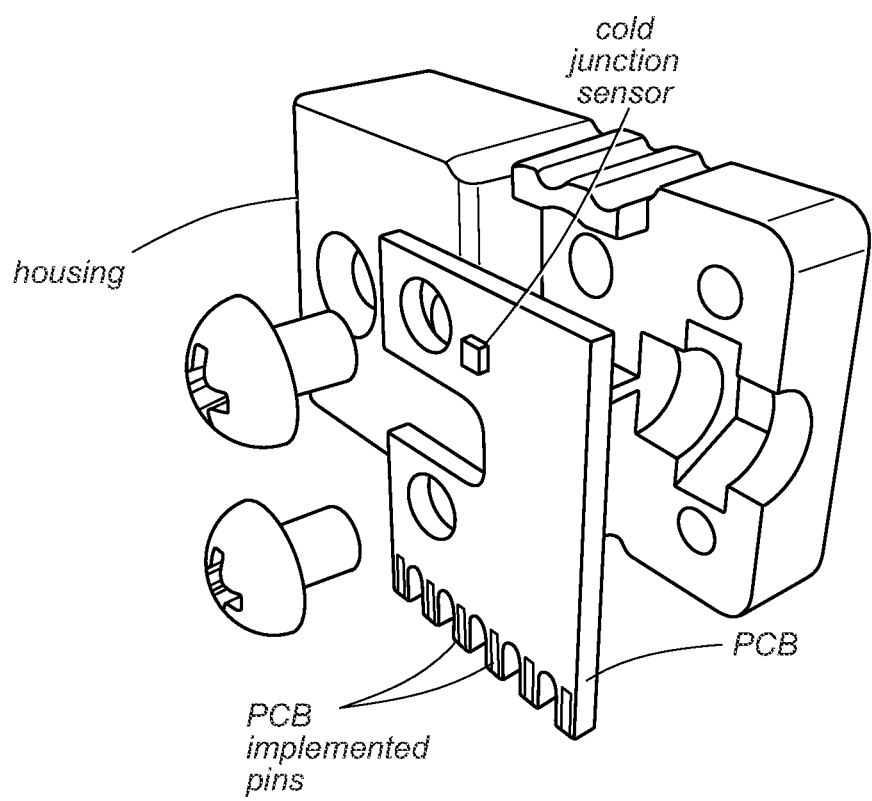
FIG. 16 presents an exploded view of the exemplary input terminal of FIG. 15, according to one embodiment.

FIG. 15 illustrates a computer-aided-design (CAD) drawing of an exemplary input terminal with PCB implemented pins, and where a CJ sensor is mounted on the PCB near the top mounting screw of the assembly, according to one embodiment (traces not shown). In some embodiments, the CJ sensor may be a board mounted temperature sensor, such as the LMT70 sensor provided by Texas Instruments Inc., although any other temperature sensors may be used as desired. The proximity of the CJ sensor to the mounting screw may provide for accurate measurement of temperature near the CJ. FIG. 16 presents an exploded view of the assembly of FIG. 15, particularly illustrating the simplicity and ease with which the PCB (with CJ sensor) may be incorporated or integrated in the input terminal.

One important benefit of the above features is that the CJ sensor can be machine populated (automatically assembled) into a fixed position on a PCB, which may be mounted into a fixed position on the plastic body of the input terminal with little or no variation in the location of the sensor or the amount of thermally insulating material between the sensor and the cold junction. Furthermore, both the assembly of the input terminal and the full assembly of the second (e.g., main) PCB may not involve any additional manual manufacturing steps beyond what the commercially available input terminals require.

Further Embodiments

Figure 10:
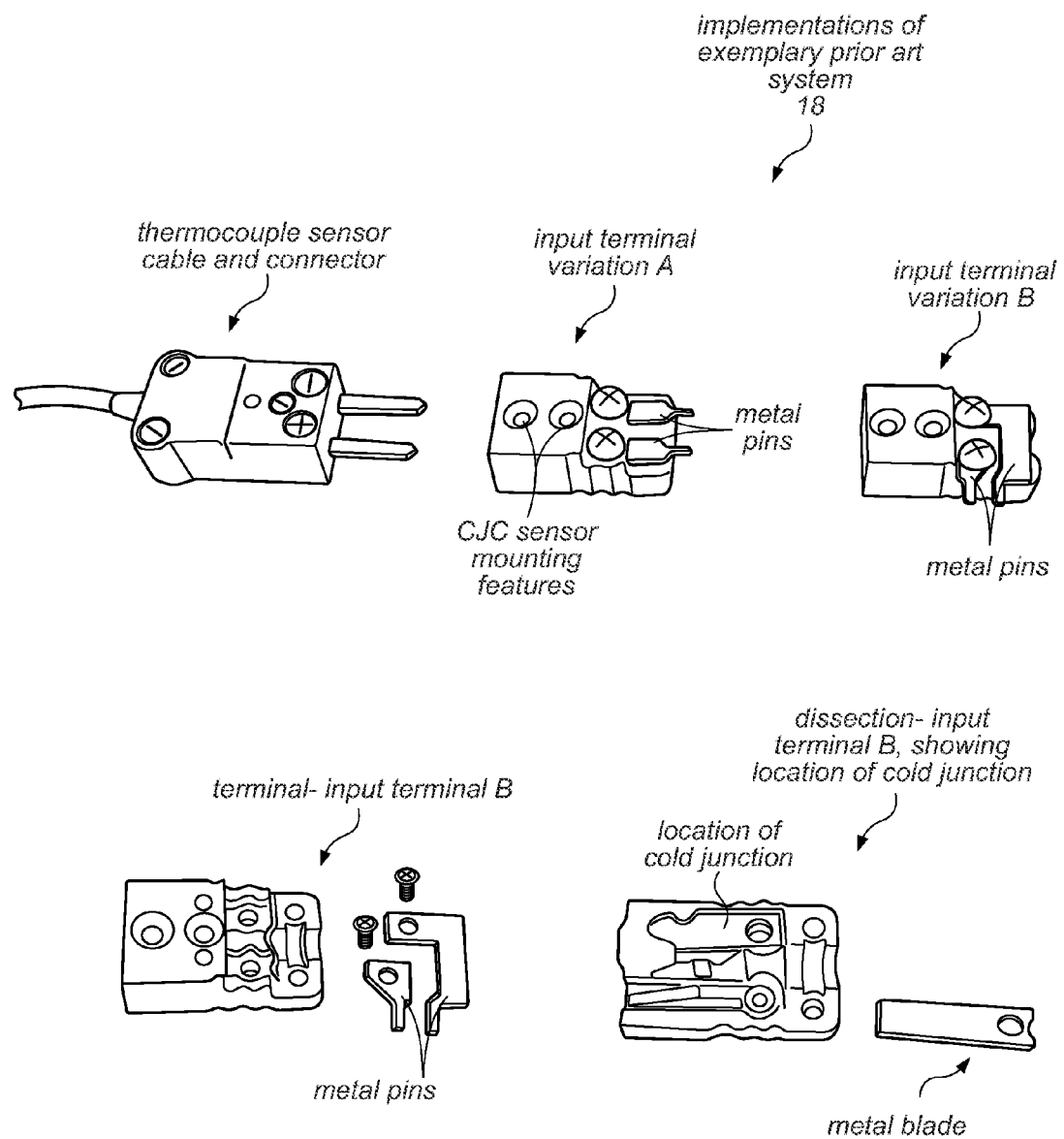
FIG. 10 illustrates various commercially available miniTC (mini thermocouple) input terminals, according to the prior art.
Figure 17:
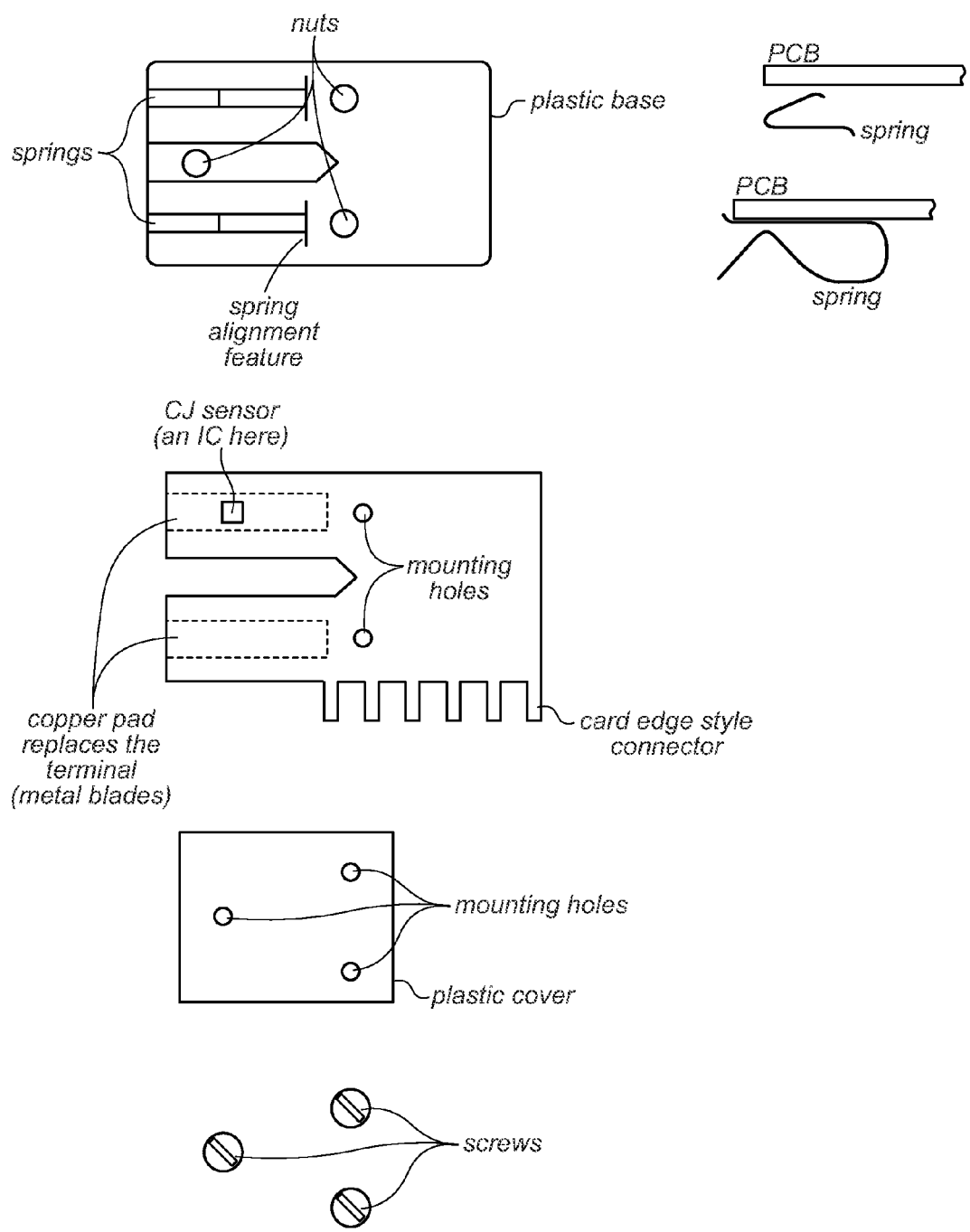
FIG. 17 illustrates an exemplary TC input terminal with PCB implemented receptacle, according to various embodiments.

The above techniques may be extended in various ways to achieve further benefits. For example, in some embodiments, the PCB may extend into the TC receptacle portion, where the extension of the PCB includes at least two pads, thereby providing electrical connections for the mating TC plug without using additional connection elements. Said another way, the PCB may extend further into the body of the input terminal in such a way that it also replaces the blades which would normally form a receptacle for a mating TC plug, e.g., a miniTC plug, as illustrated in FIG. 17. In other words, in addition to replacing the traditional metal pins, the PCB may also replace connection elements in or of the TC receptacle or receiving (female) portion of the input terminal, such as the metal blades shown in FIG. 10 (dissection view). This feature is referred to herein as a "PCB implemented receptacle".

As indicated in FIG. 17, in one embodiment, the TC input terminal may include a plastic (or other non-conducting material) base, which may be configured with springs in the receptacle or female (left) end of the input terminal, e.g., for reliable retention and electrical connection with respect to a received TC plug. Said another way, the TC receptacle portion may include one or more springs configured to provide reliable retention of, and reliable electrical connection to, the mating TC plug. Accordingly, in some embodiments, the base may include one or more spring alignment features (or elements) configured to hold the springs in place. As also shown, the base may also include means for attaching the base to other elements of the TC input terminal, e.g., nuts, configured to receive screws that clamp the assembly together, e.g., through mounting holes in the PCB and cover, e.g., plastic cover, as also indicated in FIG. 17.

In the top right, FIG. 17 presents two exemplary spring options for achieving reliable electrical connection of a PCB implemented receptacle element: a simple "V" shaped spring (spring option 1), and a slightly more complicated "loop" shaped spring (spring option 2), although it should be noted that any other type of spring (or none) may be used as desired.

As FIG. 17 further shows, in this embodiment, the PCB includes a card edge style connector (e.g., see above descriptions of FIGS. 13 and 14), as well as copper (or other metal) pads that replace the traditional metal blade elements of the receptacle end of the TC input terminal. As shown, a CJ sensor may be positioned on one of the copper (or other metal) pads, e.g., may be or include an integrated circuit (IC) that is mounted on one of the at least two pads. In another embodiment, the thermal sensor may be mounted on the input portion of the PCB proximate to one of the at least two pads. As also shown, the PCB may also include mounting holes (for receiving the mounting screws that clamp the PCB between the base and the cover).

Embodiments of the TC input terminal of FIG. 17, in which the PCB replaces both the traditional metal pins (male connector(s)) and receptacle elements (metal blades), may thus eliminate another traditional component (metal blades) from the input terminal. Moreover, as compared to an uncompensated input terminal, where the receptacle blades are copper, and are therefore the cold junction), this embodiment may allow the CJ sensor to be placed even closer to the actual cold junction.

The reduction of component count of the present TC input terminal as compared to traditional TC input terminals may provide further reductions in the cost of the TC input terminal sub-assembly. Also, since the cold junction occurs closer to the front of the connector (female end), it may allow shortening of the depth of the input terminal compared to the traditional design, e.g., requiring only as much depth as is required for mechanical reliability of the input-terminal-PCB-to-main-PCB solder joints.

Thus, embodiments of the above TC input terminal may not only reduce cost of manufacture and provide for PCB-to-PCB connection, but may also substantially improve the reliability/repeatability of component placement, i.e., may make component placement, such as positioning of the CJ sensor with respect to the CJ, much more precise, and reliably so, thereby improving the quality and reliability of CJ temperature measurement/monitoring.

A method of using the input terminal described above may operate as follows:

A TC signal from a thermocouple may be received to an input portion of a printed circuit board (PCB) of an input terminal of a thermocouple (TC) instrument, where the PCB includes first traces connecting the input portion of the PCB to an output portion of the PCB, and second traces connecting a thermal sensor mounted on the PCB to the output portion of the PCB, where the second traces at the output portion of the PCB implement a plurality of PCB implemented pins.

Temperature at or near a cold junction of the input terminal may be measured by the thermal sensor, and the TC signals may be sent to the TC instrument via the first traces. Temperature signals may be sent via the second traces to the TC instrument. Sending the TC signals and sending the temperature signals may be performed without using metal pins. In some embodiments, the PCB implemented pins may connect directly to another PCB in the thermocouple instrument. In one embodiment, the PCB implemented pins are configured to facilitate direct insertion into a host or main PCB via a wave process.

The method may further include receiving, to a TC receptacle portion of the input terminal, a mating TC plug, where the PCB extends into the TC receptacle portion and includes at least two pads. The TC signals may be conducted via the at least two pads from the mating TC plug to the first traces without using additional connection elements. Moreover, the thermal sensor may include an integrated circuit that is mounted proximate to or on one of the at least two pads.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An input terminal of a thermocouple (TC) instrument, comprising:
   a printed circuit board (PCB);
   a thermal sensor, mounted on the PCB, and configured to measure temperature at or near a cold junction of the input terminal; and
   a TC receptacle portion, coupled to the PCB, and configured to receive a mating TC plug;
   wherein the PCB comprises:
   an input portion, configured to receive TC signals from a thermocouple; and
   an output portion, configured to communicatively connect to the TC instrument;
   first traces connecting the input portion of the PCB to the output portion of the PCB, and configured to send the TC signals to the TC instrument; and
   second traces connecting the thermal sensor to the output portion of the PCB, and configured to send temperature signals to the TC instrument; and
   wherein the traces at the output portion of the PCB implement a plurality of PCB implemented pins configured to provide the TC signals and the temperature signals to the TC instrument without using metal pins.

2. The input terminal of claim 1,
   wherein the PCB implemented pins are configured to connect directly to another PCB in the thermocouple instrument.

3. The input terminal of claim 2,
   wherein the PCB implemented pins comprise PCB tabs with respective traces that are configured to connect directly to corresponding slots or holes in the other PCB in the thermocouple instrument.

4. The input terminal of claim 3,
   wherein the PCB tabs with respective traces implement a card edge style connector.

5. The input terminal of claim 1,
   wherein the PCB includes one or more mounting holes, each mounting hole comprising a respective pad configured to receive a mounting screw and to provide electrical connections for the TC signals from the TC receptacle portion to the PCB.

6. The input terminal of claim 5,
   wherein at least one mounting hole is configured to provide a low thermal impedance from the TC receptacle portion to the PCB.

7. The input terminal of claim 6,
   wherein a mounting screw of the at least one mounting hole is proximate to the cold junction, and wherein the thermal sensor is situated proximate to the mounting screw, thereby providing for accurate measurement of temperature near the cold junction.

8. The input terminal of claim 1,
   wherein the PCB implemented pins are configured to facilitate direct insertion into a host or main PCB via a wave process.

9. The input terminal of claim 1,
   wherein the PCB implemented pins are configured to connect indirectly to another PCB in the thermocouple instrument via a receptacle of the thermocouple instrument.

10. The input terminal of claim 1, further comprising:
    a housing, wherein one or more of the PCB and the thermal sensor are included in the housing.

11. The input terminal of claim 1, wherein the PCB extends into the TC receptacle portion, wherein the extension of the PCB includes at least two pads, thereby providing electrical connections for the mating TC plug without using additional connection elements.

12. The input terminal of claim 11, wherein the TC receptacle portion comprises one or more springs configured to provide reliable retention of, and electrical connection to, the mating TC plug.

13. The input terminal of claim 12, wherein the TC receptacle portion further comprises one or more spring alignment features configured to hold the one or more springs in place.

14. The input terminal of claim 11, wherein the thermal sensor is mounted on the input portion of the PCB proximate to one of the at least two pads.

15. The input terminal of claim 11, wherein the thermal sensor comprises an integrated circuit that is mounted on one of the at least two pads.

16. A method, comprising:
receiving, to an input portion of a printed circuit board (PCB) of an input terminal of a thermocouple (TC) instrument, a TC signal from a thermocouple, wherein the PCB comprises:
first traces connecting the input portion of the PCB to an output portion of the PCB; and
second traces connecting a thermal sensor mounted on the PCB to the output portion of the PCB, wherein the second traces at the output portion of the PCB implement a plurality of PCB implemented pins;
measuring, by the thermal sensor, temperature at or near a cold junction of the input terminal;
sending, via the first traces, the TC signals to the TC instrument; and
sending, via the second traces, temperature signals to the TC instrument;
wherein said sending the TC signals and said sending the temperature signals are performed without using metal pins.

17. The method of claim 16, wherein the PCB implemented pins are configured to connect directly to another PCB in the thermocouple instrument.

18. The method of claim 16, wherein the PCB implemented pins are configured to facilitate direct insertion into a host or main PCB via a wave process.

19. The method of claim 16, further comprising:
receiving, to a TC receptacle portion of the input terminal, a mating TC plug, wherein the PCB extends into the TC receptacle portion and includes at least two pads; and
conducting, via the at least two pads, the TC signals from the mating TC plug to the first traces without using additional connection elements.

20. The method of claim 19, wherein the thermal sensor comprises an integrated circuit that is mounted proximate to one of the at least two pads.

* * * * *